United States Patent [19]

Foster et al.

[11] Patent Number: 5,155,145
[45] Date of Patent: Oct. 13, 1992

[54] POLYMER IMPURITY DEACTIVATORS

[75] Inventors: George N. Foster, Bloomsbury; Walter T. Reichle, Warren, both of N.J.

[73] Assignee: Union Carbide Chemicals & Plastics Technology Corporation, Danbury, Conn.

[21] Appl. No.: 628,848

[22] Filed: Dec. 11, 1990

[51] Int. Cl.⁵ .............................................. C08K 9/06
[52] U.S. Cl. .................................... 523/212; 523/210; 523/213; 524/186; 524/261; 524/318; 524/322; 524/394; 524/432; 524/433; 524/437; 524/444; 524/451
[58] Field of Search ...................... 523/210, 212, 213; 524/186, 261, , 318, 322, 394, 432, 433, 437, 444, 451

[56] References Cited

U.S. PATENT DOCUMENTS

| | | | |
|---|---|---|---|
| 4,284,762 | 8/1981 | Miyata et al. | 528/485 |
| 4,485,204 | 11/1984 | Nabors | 524/430 |
| 4,675,356 | 6/1987 | Miyata et al. | 524/424 |
| 4,732,939 | 3/1988 | Hoshi et al. | 524/436 |

Primary Examiner—Paul R. Michl
Assistant Examiner—Edward Cain
Attorney, Agent, or Firm—S. R. Bresch

[57] ABSTRACT

A polymer impurity deactivator comprising a metal hydroxide, a hydrotalcite, or another metal oxide compound, or mixtures thereof, each of which compounds or mixtures (i) contain at least one zinc, magnesium, or aluminum cation; and (ii) have been surface treated, or mixed, with a hydrocarbon based or siloxane based amphipathic compound, each amphipathic compound having one or more polar groups incorporated into its molecular structure to provide a polar group frequency factor of at least about 0.01.

4 Claims, No Drawings

POLYMER IMPURITY DEACTIVATORS

TECHNICAL FIELD

This invention relates to the deactivation or neutralization of polymer impurities and the stabilization of the polymers in which the impurities reside. In this case, the impurities of concern are acidic products resulting from the degradation of polymers; polar comonomers, which are utilized in the preparation of the polymers; and the free radical generators used in the polymerization; and Ziegler-Natta catalyst residues.

BACKGROUND INFORMATION

In a patent application entitled Polymer Finishing Process filed on even date by George N. Foster and Hugh E. McGee under Ser. No. 625,933, a process was proposed whereby catalyst deactivator compounds, thermal oxidation stabilizer compounds, and general purpose additives were added sequentially to a polymer melt. The object of this process was to improve the stability of the polymer and avoid discoloration. While such a process is certainly advantageous, polymerization involving polar comonomers and free radical generators, as well as Ziegler-Natta catalysts, present an additional problem in that acidic products are formed from the degradation of the various materials involved in the polymerization. The identification of polymer impurity deactivators, useful in countering these degradation products, would enhance those polymer finishing processes based on polar comonomers and free radical generators.

DISCLOSURE OF INVENTION

An object of this invention, therefore, is to provide a polymer impurity deactivator, which deactivates acidic impurities detrimental to the polymer in terms of corrosion of process equipment, and discoloration and poor thermal stability of the product.

Other objects and advantages will become apparent hereinafter.

According to the invention, a polymer impurity deactivator has been discovered comprising a metal hydroxide, a hydrotalcite, or another metal oxide compound, or mixtures thereof, each of which compounds or mixtures (i) contain at least one or two zinc, magnesium, or aluminum cations; and (ii) have been surface treated, or mixed, with a hydrocarbon based or siloxane based amphipathic compound, each amphipathic compound having one or more polar groups incorporated into its molecular structure to provide a polar group frequency factor of at least about 0.01.

DETAILED DESCRIPTION

Polar comonomers, free radical generators, and Ziegler-Natta catalysts unfortunately leave impurities in the resin, which they are instrumental in producing. Since these impurities cause instability in the polymer in which they reside, polymer impurity deactivators are necessary to limit the destabilizing effect that the impurities have on the resin product.

The polymer impurity deactivator of interest here is based on a compound or mixture of compounds, which contain at least one zinc, magnesium, or aluminum cation and one or more hydroxyl or oxygen anions.

An empirical formula for the compound can be written as follows:

$$Zn_a Mg_b Al_c O_d (OH)_e$$

wherein $a + b + 6$ $\frac{a+b}{c}$ = less than 9, preferably 3 to 6

$d = a + b + c$ $e$ = a number, which will balance the cationic and anionic charges, e.g., $$2a + 2b + 3c - 2d = e$$

The compound can also be zinc oxide per se.

The hydroxide, hydrotalcite, or other oxide compound, or the above compound physically mixed with zinc oxide, are surface treated with hydrocarbon or siloxane based amphipathic compounds having one or more polar functionalities incorporated into each of their molecular structures. Typical polar functionalities are hydroxy, amino, bis(hydroxyalkyl)amino, hydroxylamino, hindered phenolic or hindered amino, ethoxylate, epoxy, polyether, carboxyl and carboxylate salts or esters, e.g., COO—, —COOH, —COOR, COOR—, and —COOM wherein R is a hydrocarbyl group and M is a metal. The number of polar groups per molecule in each amphipathic compound can be an integer in the range of from 1 to 200, but it is preferably expressed in terms of a polar group frequency factor, which can be in the range of about 0.01 to about 1 and is preferably in the range of about 0.05 to about 0.5.

The term "amphipathic compound" is defined as a compound, which is both hydrophilic and hydrophobic. It, generally, shares a long chain or sequence of alkyl, dimethyl, or methylalkyl siloxane units with periodic or end groups having polar funtionalities. The polar functionalities can be incorporated into the structure of the amphipathic compound as either an end group, a pendant substituent, or both, and there can be several polar functionalities, in each compound, preferably hydroxy, amino, epoxy, or a carboxylic acid or its metal salts.

Examples of the hydrocarbon based amphipathic compounds are partial esters of alkyl carboxylic acids (mono- and di-); Partial esters of alkyl polyols; alkyl amines including primary, secondary, and tertiary amines; alkyl dihydroxyalkylamines optionally including 2 to 8 moles of alkylene oxide; and alkyl carboxylic acids and the alkali metal, alkaline earth metal, and zinc salts thereof, e.g., sodium, zinc, calcium, and magnesium stearate. The alkyl groups preferably have 8 to 30 carbon atoms and can be branched chain or linear. The foregoing compounds can be synthetic or derived from fatty acids or coal products.

Suitable hydrocarbon based amphipathic compounds are further exemplified by glycerol; mannitol; sorbitol; glyceryl mono- and di- dodecanoate and octadecanoate esters; dodecyl and octadecyl adipate and thio dipropionate; dodecylamine; hexadecylamine; octadecylamine; dodecyl diethanolamine; hexadecyl diethanolamine; octodecyl diethanolamine; dodecyl dimethanolamine; hexadecyl dimethanolamine; octadecyl dimethanolamine; 12-hydroxy stearate; stearoyl lactylate; dodecylic acid; hexadecylic acid; and octadecylic acid.

Examples of the siloxane based amphipathic compounds are hydroxylalkyl, aminoalkyl, hydroxyamino, hindered phenolic or hindered amino, ethoxylated or epoxy substituted polydimethylsiloxanes (cyclic, linear, or branched), optionally including alkyl substituents. The number of siloxane units can be in the range of about 4 to about 200 per molecule and the number of functionalized siloxane units can be about 4 to about 100.

A formula for a typical siloxane based amphipathic compound can be written as follows:

$$MD_xD'_yM$$

wherein $M = R_3Si(O)_{0.5}$ or $R'R_2Si(O)_{0.5}$
R = methyl or ethyl
R' = a linear, branched, or cyclic alkyl having 3 to 100 carbon atoms or a linear or branched alkoxy having 1 to 100 carbon atoms
$D = R_2SiO$ $$D' = \begin{array}{c} R-SiO \\ | \\ R' \end{array}$$

x/y is greater than or equal to 0
x+y is greater than or equal to 4, preferably 4 to 500 with the proviso that a sufficient number of R and R' groups are, or contain, polar functionalities to provide a polar group frequency factor of at least 0.01, and each R and R' are the same or different.

Suitable siloxane based amphipathic compounds are exemplified by polyethylene glycol, 3-hydroxy propyl, propyl glycidyl ether, propoxy propanediol, propyl amine, and di-2-hydroxy ethyl propyl amine functionalized polydimethyl siloxanes having 5 to 20 repeating units, and a substituted polydimethylsiloxane containing 2 to 5 moles of ethoxylate.

The siloxane based amphipathic compounds are preferred over the hydrocarbon based compounds because they are intrinsically more resistant to thermal oxidation.

The "polar group frequency factor" is the ratio of the total number of polar groups in each amphipathic compound to the total number of C-C, C-O, Si-C, and Si-O linkages in the amphipathic compound.

For example,

I. in the amphipathic compound having the following formula:

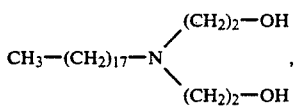

the number of polar groups, i.e. OH groups = 2; —N=-group = 1
the number of C-C linkages = 22; and
the polar frequency factor = 3/11 = 0.27, II. in the amphipathic compound having the following formula:

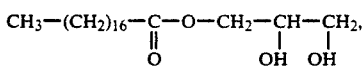

the number of polar groups, i.e., OH groups = 2;

$$-\underset{\underset{O}{\|}}{C}-O-\ \text{group}=1$$

the number of C—C linkages = 8.5 + 1.5 = 10
the polar frequency factor = 3/10 = 0.3.

The mixed metal hydroxides of this invention can be prepared by the following Procedure. An aqueous solution of alkali metal hydroxide and alkali metal carbonate is added to an aqueous solution of aluminum, magnesium, or zinc cations with a "fugitive" (soluble) cation such as $$RCO^-\ \underset{\underset{O}{\|}}{}$$

wherein $R = CH_3^+$ or $NO_3^-$ to yield $$Zn_xMg_yAl_m(OH)_{2(x+y+m)}(A^-)_m \cdot BH_2O$$

wherein $$\frac{x+y}{m}$$

is less than 9, preferably 3 to 6
A = a "fugitive" anion such as a nitrate or a carboxylate
B = an integer from 0 to 5 via precipitation. The precipitate is recovered by filtration, washed with distilled water, and dried at about 100° C. to remove the bulk of the water. After initial drying, the mixture is heated at about 450° C. in air to give: $Zn_aMg_bAl_cO_d(OH)_e$ (see above)
with the loss of water and the A− anion. The dried mixture is then pulverized (about 95 percent by weight is less than 12 microns, and preferably about 99 Percent by weight is less than 1 micron, in diameter).

The mixed metal hydroxide or oxide compound can be coated with the amphipathic compound via a suitable inert solvent such as methylene chloride or hexane or can be introduced into an aqueous dispersion of the amphipathic compound, followed by evaporation. As an alternative procedure, the amphipathic compounds, which normally exist as either low melting solids or viscous liquids can be intensively mixed with the mixed metal compound at temperatures of about 45° to about 120° C to surface coat the mixed metal hydroxide or oxide powder.

As liquids, the amphipathic compounds can be used in an amount of about 2 to about 150 percent by weight based on the weight of the mixed metal hydroxide or oxide and preferably in amounts of about 5 to about 70 percent by weight. As solids, the amphipathic compounds can be used in amounts of about 2 to about 50 percent by weight based on the weight of the mixed metal hydroxide or oxide and preferably in amounts of about 25 to about 50 percent by weight.

The surface treated, mixed metal hydroxide or oxide can be incorporated into the polymer as described in the Polymer Finishing Process referred to above or by either in situ addition to the reactor or post reactor, preferably during the melt compounding/pelleting stage. Other additives can be added along with the surface treated, mixed hydroxide or oxide such as ultraviolet stabilizers, thermal oxidation stabilizers, antistatic agents, pigments, dyes, fillers, extenders, slip agents, fire retardants, plasticizers, processing aids, lubricants, smoke inhibitors, viscosity control agents, vulcanizing agents, crosslinking agents, crosslinking boosters, and anti-block/slip agents.

Typical polymers to which the subject polymer impurity deactivators are added are thermoplastic resins prepared with Ziegler-Natta or transition metal catalysts or polymers resulting from other polymerization or grafting reactions where groups are present which can release acidic products such as hydrochloric acid and acetic acid during processing at elevated temperatures.

These thermoplastic resins can be any crosslinkable homopolymers or copolymers produced from two or more comonomers, or a blend of two or more of these polymers, conventionally used in film, sheet, and tubing, and as jacketing and/or insulating materials in wire and cable applications, provided that the resin either contains a polar monomer or the polymerization or grafting process used to provide the resin utilizes a free radical generator. Generally, the monomers useful in the production of these homopolymers and copolymers will have 2 to 20 carbon atoms, and preferably 2 to 12 carbon atoms. Examples of such monomers are alpha-olefins such as ethylene, propylene, 1-butene, 1-hexene, 4-methyl-1-pentene, and 1-octene; polar compounds, which can be unsaturated esters such as vinyl acetate, ethyl acrylate, methyl acrylate, methyl methacrylate, t-butyl acrylate, n-butyl acrylate, n-butyl methacrylate, 2-ethlyhexyl acrylate, and other alkyl acrylates; diolefins such as 1,4-pentadiene, 1,3-hexadiene, 1,5-hexadiene, 1,4-octadiene, and ethylidene norbornene, commonly the third monomer in a terpolymer; other monomers such as styrene, p-methyl styrene, alpha-methyl styrene, p-chloro styrene, vinyl naphthalene, and similar aryl olefins; nitriles such as acrylonitrile, methacrylonitrile, and alpha-chloroacrylonitrile; vinyl methyl ketone, vinyl methyl ether, vinylidene chloride, maleic anhydride, vinyl chloride, vinylidene chloride, vinyl alcohol, tetrafluoroethylene, and chlorotrifluoroethylene; and acrylic acid, methacrylic acid, and other similar unsaturated acids.

The homopolymers and copolymers referred to can be non-halogenated, or halogenated in a conventional manner, generally with chlorine or bromine. Examples of halogenated polymers are polyvinyl chloride, polyvinylidene chloride, and polytetrafluoroethylene. In addition to polyolefins, included among the polymers can be polyesters, polycarbonates, and polyurethanes.

The thermoplastic resin can also be, for example, a high pressure homopolymer of ethylene; a copolymer of ethylene and one or more alpha-olefins having 3 to 12 carbon atoms; a homopolymer or copolymer of ethylene having a hydrolyzable silane grafted to their backbones; a copolymer of ethylene and a hydrolyzable silane; or a copolymer of an alpha-olefin having 2 to 12 carbon atoms and an unsaturated ester having 4 to 20 carbon atoms, e.g., an ethylene/ethyl acrylate or vinyl acetate copolymer; an ethylene/ethyl acrylate or vinyl acetate/hydrolyzable silane terpolymer; and ethylene/ethyl acrylate or vinyl acetate copolymers having a hydrolyzable silane grafted to their backbones.

The homopolymers or copolymers can be crosslinked or cured with an organic peroxide, or to make them hydrolyzable, they can be grafted with a vinyl trialkoxy silane in the presence of an organic peroxide which acts as a free radical generator or catalyst. Useful vinyl trialkoxy silanes include vinyl trimethoxy silane, vinyl triethoxy silane, and vinyl triisopropoxy silane.

These polymers are useful in a number of manufacturing processes including blown and cast film extrusion, injection molding of parts or articles, blown molding of bottles, insulation and jacketing extrusion for wire and cable, and sheet extrusion for thermoforming.

The patent application and patents referred to in this specification are incorporated by reference herein.

The invention is illustrated by the following examples.

EXAMPLES 1 to 18

The examples show that the polymer impurity deactivators of the invention provide improved discoloration resistance together with at least equal stabilization in combination with the antioxidants used relative to control compositions of Examples 1, 2, 9, 10 and 18. The control compositions are either based on the use of mixed metal hydroxides containing magnesium and aluminum cations or deactivator/synergist pairs of zinc stearate or oxide and N,N-di-2-hydroxyethyl-octadecyl amine (the polar group frequency factor equals 0.27). The surface treated, mixed metal hydroxides are prepared using either N,N-di-2-hydroxyethyl-pentadecyl amine (the polar group frequency factor equals 0.32) or 3-hydroxypropyl substituted polydimethyl siloxane (the polar group frequency factor equals 0.31). The amphipathic compounds are coated onto the mixed metal hydroxides (at 15 percent by weight based on the weight of the mixed metal hydroxides) from methylene chloride solution. The additives are dryblended with the granular resins and processed at 250° C. to 260° C. using a Brabender extruder equipped with a six inch tape die. Melt flow properties and yellowness index changes are then measured on the extruded tapes.

Variables and properties are set forth in the Table.

TABLE

| | Example | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Resin | | | | | | | | | | | | | | | | | | |
| I | 99.88 | 99.86 | 99.89 | 99.89 | 99.89 | 99.89 | 99.89 | 99.89 | — | — | — | — | — | — | — | — | — | — |
| II | — | — | — | — | — | — | — | — | | | | | | | | | | |
| Antioxidant | | | | | | | | | | | | | | | | | | |
| I | 0.03 | 0.03 | 0.03 | 0.03 | 0.03 | 0.03 | 0.03 | 0.03 | 0.05 | 0.05 | 0.05 | 0.05 | 0.05 | 0.05 | 0.05 | 0.05 | 0.05 | 0.00 |
| II | 0.03 | 0.03 | 0.03 | 0.03 | 0.03 | 0.03 | 0.03 | 0.03 | 0.05 | 0.05 | 0.05 | 0.05 | 0.05 | 0.05 | 0.05 | 0.05 | 0.05 | 0.00 |
| Catalyst Deactivator | | | | | | | | | | | | | | | | | | |
| I | 0.04 | 0.04 | — | — | — | — | — | — | — | — | — | — | — | — | — | — | — | — |
| II | — | 0.04 | — | — | — | — | — | — | — | — | 0.10 | 0.05 | 0.05 | 0.05 | 0.05 | 0.05 | 0.05 | — |
| III | 0.02 | — | — | — | — | — | — | — | — | — | — | — | — | — | — | — | — | — |
| IV | — | — | — | 0.05 | — | — | — | — | — | — | — | — | — | — | — | — | — | — |
| V | — | — | — | — | — | 0.05 | — | — | — | — | — | — | — | — | — | — | — | — |

TABLE-continued

| | Example | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| VI | — | — | — | — | — | — | — | 0.05 | — | — | — | — | — | — | — | — | — | — |
| VII | — | — | 0.05 | — | — | — | — | — | — | — | — | — | — | — | — | — | — | — |
| VIII | — | — | — | — | 0.05 | — | — | — | — | — | — | — | — | — | — | — | — | — |
| IX | — | — | — | — | — | — | 0.05 | — | — | — | — | — | — | — | — | — | — | — |
| X | — | — | — | — | — | — | — | — | — | — | — | 0.05 | — | — | — | — | — | — |
| XI | — | — | — | — | — | — | — | — | — | — | — | — | 0.05 | — | — | — | — | — |
| XII | — | — | — | — | — | — | — | — | — | — | — | — | — | 0.05 | — | — | — | — |
| XIII | — | — | — | — | — | — | — | — | — | — | — | — | — | — | 0.05 | — | — | — |
| XIV | — | — | — | — | — | — | — | — | — | — | — | — | — | — | — | 0.05 | — | — |
| XV | — | — | — | — | — | — | — | — | — | — | — | — | — | — | — | — | 0.05 | — |
| Properties | | | | | | | | | | | | | | | | | | |
| I | 0.81 | 0.75 | 0.84 | 0.79 | 0.82 | 0.78 | 0.71 | 0.78 | 0.14 | 0.18 | 0.18 | 0.17 | 0.17 | 0.18 | 0.17 | 0.18 | 0.17 | 0.17 |
| II | 29.1 | 31.3 | 28.2 | 28.2 | 28.4 | 28.5 | 31.3 | 28.5 | 118 | 84 | 86 | 94 | 80 | 86 | 90 | 89 | 91 | 82 |
| III | 1.2 | 3.1 | 3.31 | 5.1 | 0.39 | 3.5 | −0.66 | 3.9 | 29 | 26 | 15 | 14 | 14 | 13 | 14 | 14 | 14 | 26 |
| IV | 3.2 | 4.6 | 5.46 | 10.0 | 1.84 | 6.4 | 1.08 | 9.1 | 30 | 33 | 16 | 16 | 14 | 15 | 15 | 15 | 15 | 28 |
| V | — | — | — | — | — | — | — | — | 41 | 33 | 37 | 39 | 35 | 35 | 36 | 36 | 38 | 34 |

Notes to Table:

1. The values set forth for resin, antioxidant, and polymer impurity deactivator are in percent by weight based on the weight of the total composition.
2. Resin I is a low density polyethylene made with a titanium based catalyst in accordance with U.S. Pat. No. 4,302,566, the comonomer is 1-butene; the percent by weight of comonomer is 15; the density is 0.918 gram per cubic centimeter; and the melt index is 0.05 decigram per minute.
3. Resin II is a low density polyethylene made with a vanadium based catalyst in accordance with U.S. Pat. No. 4,508,842; the comonomer is 1-butene; the percent by weight of comonomer is 16; the density is 0.920 gram per cubic centimeter; and the melt index is 0.20 decigram per minute.
4. Antioxidant I is octadecyl-3-(3,5-di-tert-butyl-4-hydroxy phenyl) propionate.
5. Antioxidant II is tris-(2,4-di-tert-butyl phenyl)-phosphite.
6. The polymer impurity deactivators are described as follows:
   I. N,N-di-2-hydroxyethyl octadecyl amine
   II. zinc stearate
   III. zinc oxide
   IV. $Mg_6Al_2O_8(OH)_2$ (uncoated). This formula is approximate.
   V. Same as IV except coated with 15 percent by weight 3-hydroxypropyl-modified polydimethylsiloxane.
   VI. Same as IV except coated with 15 percent by weight N,N-di-2-hydroxyethyl-octadecylamine
   VII. $Zn_6Al_2O_8(OH)_2$ (uncoated). This formula is approximate.
   VIII. Same as VII except coated with 15 percent by weight 3-hydroxypropyl-modified polydimethylsiloxane.
   IX. Same as VII except coated with 15 percent by weight N,N-di-2-hydroxyethyl-octadecylamine.
   X. $Mg_6Al_2O_8(OH)_2$
   XI. Zn/Al (atomic ratio about 3:1)
   XII. $Mg_4Zn_2/Al_2$ (atomic ratio of(Mg+Zn)/Al about 3:1)
   XIII. $Mg_5Zn/Al_2$ (atomic ratio of(Mg+Zn)/Al about 3:1)
   XIV. $Mg_5/Al_2$ (atomic ratio about 2.5:1)
   XV. $Mg_{5.5}Zn_{0.5}/Al_2$ (atomic ratio of(Mg+Zn)/Al about 3:1)
7. Properties are determined as follows:
   I. Melt Index is determined under ASTM D-1238 and is given in decigrams per minute.
   II. Melt Flow Ratio is determined under ASTM D-1238.
   III. Initial yellowness index is determined under ASTM D-1925. It is an indication of discoloration resistance, the higher the value, the lower the resistance.
   IV. Yellowness Index after one month at 60° C. is determined under ASTM D-1925.
   V. Die Swell is determined under ASTM D-1238.
8. In example 18, five hundred parts per million each of antioxidant I and zinc stearate are added for melt index and melt flow ratio measurements.

We claim:

1. A composition comprising a polymer impurity deactivator in an impurity deactivating amount and a thermoplastic resin containing acidic impurities, said polymer impurity deactivator comprising a metal hydroxide, a hydrotalcite, or another metal oxide compound, or mixtures thereof, each of which compounds or mixtures
   (i) contain at least one zinc, magnesium or aluminum cation; and
   (ii) has been surface treated with one or more alkyl amine amphipathic compounds or dihydroxyalkylamine amphipathic compounds, each amphipathic compound having one or more polar groups incorporated into its molecular structure to provide a polar group frequency factor of at least about 0.01, wherein the amphipathic compound is such that it will not react chemically with the hydroxide, the hydrotalcite, or the oxide compound.

2. The composition defined in claim 1 wherein the amphipathic compound contains at least one alkyl group having 8 to 50 carbon atoms.

3. The composition defined in claim 2 wherein the amphipathic compound is an alkali metal, alkaline earth metal, or zinc alkyl amine.

4. The composition defined in claim 2 wherein the amine is a dihydroxyalkylamine.

* * * * *

UNITED STATES PATENT AND TRADEMARK OFFICE
CERTIFICATE OF CORRECTION

PATENT NO. : 5,155,145  
DATED : October 13, 1992  
INVENTOR(S) : Foster et al

Page 1 of 2

It is certified that error appears in the above-indentified patent and that said Letters Patent is hereby corrected as shown below:

The title page, should be deleted to be replaced with the attached title page.

Column 7, line 49, change formula to $--Mg_6Al_2O_8(OH)_2--$

Column 8, lines 62 to 64, cancel claim 3.

Signed and Sealed this

Fifth Day of October, 1993

Attest:

*Attesting Officer*

BRUCE LEHMAN

*Commissioner of Patents and Trademarks*

United States Patent [19]

Foster et al.

[11] Patent Number: 5,155,145

[45] Date of Patent: Oct. 13, 1992

[54] POLYMER IMPURITY DEACTIVATORS

[75] Inventors: George N. Foster, Bloomsbury; Walter T. Reichle, Warren, both of N.J.

[73] Assignee: Union Carbide Chemicals & Plastics Technology Corporation, Danbury, Conn.

[21] Appl. No.: 628,848

[22] Filed: Dec. 11, 1990

[51] Int. Cl.⁵ ............................................... C08K 9/06
[52] U.S. Cl. .................................... 523/212; 523/210; 523/213; 524/186; 524/261; 524/318; 524/322; 524/394; 524/432; 524/433; 524/437; 524/444; 524/451
[58] Field of Search ............... 523/210, 212, 213; 524/186, 261, , 318, 322, 394, 432, 433, 437, 444, 451

[56] References Cited

U.S. PATENT DOCUMENTS

| | | | |
|---|---|---|---|
| 4,284,762 | 8/1981 | Miyata et al. | 528/485 |
| 4,485,204 | 11/1984 | Nabors | 524/430 |
| 4,675,356 | 6/1987 | Miyata et al. | 524/424 |
| 4,732,939 | 3/1988 | Hoshi et al. | 524/436 |

Primary Examiner—Paul R. Michl
Assistant Examiner—Edward Cain
Attorney, Agent, or Firm—S. R. Bresch

[57] ABSTRACT

A polymer impurity deactivator comprising a metal hydroxide, a hydrotalcite, or another metal oxide compound, or mixtures thereof, each of which compounds or mixtures
(i) contain at least one zinc, magnesium, or aluminum cation; and
(ii) have been surface treated, or mixed, with a hydrocarbon based or siloxane based amphipathic compound, each amphipathic compound having one or more polar groups incorporated into its molecular structure to provide a polar group frequency factor of at least about 0.01.

3 Claims, No Drawings